United States Patent [19]

Patton et al.

[11] Patent Number: 5,464,906
[45] Date of Patent: Nov. 7, 1995

[54] ETHYLENE HOMOPOLYMERIZATION USING GROUP 3 METAL COMPLEXES

[75] Inventors: Jasson T. Patton; David R. Neithamer, both of Midland, Mich.

[73] Assignee: The Dow Chemical Company, Midland, Mich.

[21] Appl. No.: 342,984

[22] Filed: Nov. 21, 1994

[51] Int. Cl.$^6$ .................................................. C08F 4/52
[52] U.S. Cl. ..................... 525/240; 525/268; 525/269; 525/270; 526/126; 526/134; 526/135; 526/145; 526/160; 526/170; 526/113; 526/114; 526/348.2; 526/352
[58] Field of Search ..................... 526/126, 134, 526/135, 145, 160, 170, 113, 114; 525/268, 269, 270, 240

[56] References Cited

U.S. PATENT DOCUMENTS

| | | | |
|---|---|---|---|
| 5,055,438 | 10/1991 | Canich | 502/117 |
| 5,321,106 | 6/1994 | LaPointe | 526/126 |

FOREIGN PATENT DOCUMENTS

| | | |
|---|---|---|
| 416815 | 3/1991 | European Pat. Off. . |
| 93/06268 | 7/1993 | WIPO . |
| 94/01471 | 5/1994 | WIPO . |

OTHER PUBLICATIONS

Shapiro et al., *Organometal.*, 1990, 9. 867–869.
Ballard et al., *J. Chem. Soc. Chem. Comm.* (1978) 994–995.
*J. Chem. Soc. Chem. Comm.*, 1993, 383–384.
Lambert, J. B., et al., *Organometallics*, 1994, 13, 2430–2443.
Ewen, et al., *J. Am. Chem. Soc.* 110, 6255–5256 (1980).
Wild et al., *J. Organomet. Chem*, 232, 233–47, (1982).

*Primary Examiner*—Mark Nagumo

[57] ABSTRACT

Ethylene is homopolymerized in the presence of a catalyst consisting essentially of a Group 3 metal complex, preferably a scandium complex, having a bridged ligand structure. Optionally polymer blends are prepared by combining the process with another polymerization process, either in series or in parallel.

11 Claims, No Drawings

ETHYLENE HOMOPOLYMERIZATION USING GROUP 3 METAL COMPLEXES

BACKGROUND OF THE INVENTION

This invention relates to the use of certain Group 3 metal complexes to form ethylene homopolymers in high yield. More particularly, this invention relates to such processes wherein the metal complexes have a bridged ligand structure, such that the metal is linked to a cyclopentadienyl group (which optionally may be substituted as explained hereinafter) via a η-bond and also linked via a divalent ligand group attached to both the cyclopentadienyl group and the metal.

Certain Group 3 metal complexes (other than those based on scandium), and methods for their preparation are disclosed in U.S. Application Ser. No. 545,403, filed Jul. 3, 1990 (EP-A-416,815) pending. The complexes, which possessed a bridged structure, were disclosed as being active polymerization catalysts when combined with activating cocatalysts such as aluminoxanes. In U.S. Pat. No. 5,064,802, cationic metal complexes including complexes of Group 3 metals including such complexes having a bridged structure were disclosed. Such cationic complexes result by combination of metal complex precursors with a cation forming activating cocatalyst, particularly an ammonium salt of tetrakis(pentafluorophenyl)borate. In Shapiro et al., *Organometal.*, 1990, 9, 867–869, scandium complexes were disclosed which were coordinated Lewis base adducts, having relatively poor catalytic properties. The reference reported that small quantities of oligomeric or polymeric propene, 1-butene and 1-pentene addition products were formed with lengthy reaction times using as a catalyst the dimeric hydride derivative, bis( (t-butylamido)(tetramethyl-η$^5$-cyclopentadienyl)dimethylsilanescandium ditrimethylphosphine) dihydride.

SUMMARY OF THE INVENTION

According to the present invention there is provided an ethylene homopolymerization process comprising contacting an ethylene containing reaction mixture with a catalyst consisting essentially of a metal complex corresponding to the formula:

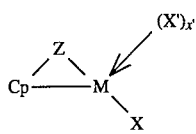

or a dimer thereof
wherein:
M is a Group 3 metal;
Cp is a cyclopentadienyl group bound in an η$^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 40 nonhydrogen atoms, or optionally, two or more such substituents are joined together to form a hydrocarbylene group thereby causing Cp to have a fused ring structure;
Z is a moiety comprising boron, or a member of Group 14 of the Periodic Table of the Elements, and optionally nitrogen, phosphorus, sulfur or oxygen, said moiety having up to 20 non-hydrogen atoms, and optionally Cp and Z together form a fused ring system;
X, independently each occurrence, is hydride, hydrocarbyl, silyl, germyl, hydrocarbyloxy, amido, phosphido, sulphido, or a combination thereof, said X containing up to 50 atoms;
X' is a stable, weakly coordinating Lewis base ligand group; and
x' is 0 or 1,
and recovering the polymeric product.

Beneficially, the process does not employ activating cocatalysts which are normally used in combination with prior art homogeneous Ziegler-Natta catalysts. Thus, product purity is improved due to the lack of quantities of residual activating cocatalyst. Alternatively, the process need not utilize a purification step in order to remove residues of the activating cocatalyst. Process costs are also reduced due to the omission of a cocatalyst.

Further according to the present invention the present polymerization process may be combined with other polymerization processes, either in series or in parallel, to prepare polymer blends having unique properties.

DETAILED DESCRIPTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

By the term "weakly coordinating" as used with respect to the optional Lewis base ligand group is meant that such group is less coordinating than a trimethylphosphine group, as determined by ethylene polymerization activity. Less coordinating Lewis base ligands result in catalysts that are more active, that is the efficiency of such catalysts is improved. The Lewis base ligand should be readily displaced by ethylene in order that the polymerization process not be detrimentally affected by the ligand group. Generally, triphenylphosphine, fluorinated tri aryl phosphines, especially tris(pentafluorophenyl)phosphine, tetrahydrofuran, 2,5-dimethyltetrahydrofuran, and olefin Lewis bases may be present in the complexes. Most preferably however, no Lewis base ligand is utilized.

Preferred monocyclopentadienyl metal coordination complexes according to the present invention correspond to the formula:

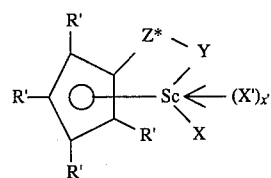

or a dimer thereof
wherein R' each occurrence is independently selected from the group consisting of hydrogen, alkyl, aryl, silyl, germyl, cyano, halo and combinations thereof, said R' having up to 30 atoms, or two R' groups together form a divalent hydrocarbylene derivative connected to adjacent positions of the cyclopentadienyl ring;
X is hydride, hydrocarbyl, silyl, or a combination thereof, said X having up to 30 atoms;

Y is —O—, —S—, —NR*—, —PR*—;

Z* is SiR*$_2$, CR*$_2$, SiR*$_2$SiR*$_2$, CR*$_2$CR*$_2$, CR*=CR*, CR*$_2$SiR*$_2$, GeR*$_2$, or BR*; wherein:

R* each occurrence is independently selected from the group consisting of hydrogen, alkyl, aryl, silyl, halogenated alkyl, halogenated aryl groups having up to 20 non-hydrogen atoms, and mixtures thereof;

X' is triphenylphosphine, a fluorinated tri aryl phosphine, tetrahydrofuran, or 2,5-dimethyltetrahydrofuran; and x' is 0 or 1.

Further preferably, Y is a nitrogen or phosphorus containing group corresponding to the formula 'N(R")— or —P(R")—, wherein R" is $C_{1-10}$ hydrocarbyl.

Most highly preferred metal coordination complexes are amidosilyl-, amidoalkyl-, phosphidosilyl-,or phosphidoalkyl- compounds corresponding to the formula:

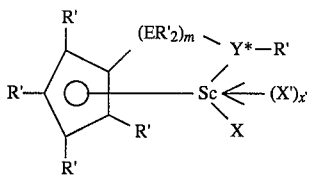

or a dimer thereof wherein:

Y* is N or P;

X is hydride, methyl, bis(trimethylsilyl)-methyl; trimethylsilyl, trimethylsilylmethyl, allyl, 2-(N,N-dimethylaminomethyl)phenyl, or 2-(N,N-dimethylamino)benzyl;

R' each occurrence is independently selected from the group consisting of hydrogen, silyl, alkyl, aryl and combinations thereof having up to 10 carbon or silicon atoms, or two R' groups together form a divalent hydrocarbylene derivative connected to adjacent positions of the cyclopentadienyl ring forming a fused ring system;

E independently each occurrence is silicon or carbon;

m is 1 or 2;

X' is tris(pentafluorophenyl )phosphine or 2,5-dimethyltetrahydrofuran; and x' is 0 or 1.

Examples of the above Group 3 metal complexes include compounds wherein the R' on the amido group is methyl, ethyl, propyl, butyl, pentyl, hexyl, (including isomers), cyclododecyl, norbornyl, benzyl, or phenyl; and the Cp group is cyclopentadienyl, tetramethylcyclopentadienyl, indenyl, tetrahydroindenyl, fluorenyl, tetrahydrofluorenyl, or octahydrofluorenyl.

Illustrative compounds include: (N-tert-butylamido) (dimethyl)(tetramethyl-η$^5$-cyclopentadienyl)-silane scandium hydride.triphenylphosphine dimer, (N-tert-butylamido) (dimethyl)(tetramethyl-η$^5$-cyclopentadienyl)silane scandium hydride.(2,5dimethyltetrahydrofuran, (N-tert-butylamido) (dimethyl)(tetramethyl-η$^5$-cyclopentadienyl) silane scandium bis(trimethylsilyl)methyl, (N-phenylamido) (dimethyl)(tetramethyl-η$^5$-cyclopentadienyl)silane scandium bis(trimethylsilyl)methyl, (N-n-butylamido)(dimethyl)(tetramethyl-η$^5$-cyclopentadienyl)silane scandium bis(trimethylsilyl)methyl, (N-sec-butylamido)(dimethyl)(tetramethyl-η$^5$-cyclopentadienyl)silane scandium bis(trimethylsilyl)methyl, (N-tert-butylamido)(dimethyl)(tetramethyl-η$^5$-cyclopentadienyl)silane scandium methyl.triphenylphosphine, (N-tert-butylamido)(dimethyl)(tetramethyl-η$^5$-cyclopentadienyl)silane scandium methyl.(2,5-dimethyltetrahydrofuran, (N-tert-butylamido)-(dimethyl) (tetramethyl-η$^5$-cyclopentadienyl)silane scandium benzyl.triphenylphosphine, (N-tert-butylamido)(dimethyl)(fluorenyl)silane scandium hydridetriphenylphosphine, (N-sec-dodecylamido)(dimethyl)(fluorenyl)silane scandium hydride.(2,5-dimethyltetrahydrofuran, (N-n-butylamido)(dimethyl)(tetramethyl-η$^5$-cyclopentadienyl)silane scandium hydride.(2,5dimethyltetrahydrofuran, (N-n-butylamido)(dimethyl)-(tetramethyl-η$^5$-cyclopentadienyl)silane scandium bis(trimethylsilyl)methyl, (N-tert-butylphosphido)(dimethyl)(tetramethyl-η$^5$-cyclopentadienyl)silane scandium bis(trimethylsilyl)methyl, (N-tert-butylamido)(dimethyl)(octahydrofluorenyl)silane scandium methyltriphenylphosphine, (N-tert-butylamido)(dimethyl)(indenyl)silane scandium methyl.(2,5-dimethyltetrahydrofuran, and (N-tert-butylamido)(dimethyl)(tetrahydroindenyl)silane scandium 2-(N,N-dimethylamino)benzyl.triphenylphosphine.

Additional metal complexes containing yttrium as well as complexes containing other ligand groups will be readily apparent to the skilled artisan.

The complexes can be prepared by combining a precursor metal compound corresponding to the formula $M(X_a)_3X'_{x'}$, wherein M, X' and x' are as previously defined, and $X_a$ is X or halide, with the added proviso that X in two occurrences is a monovalent anionic moiety having up to 20 non-hydrogen atoms capable of displacement by a dianion figand, $(Cp—Z)^{-2}$, wherein Cp and Z are as previously defined; with a dimetallated derivative, especially a dilithiated- or diGrignard derivative of the dianion ligand $(Z—Cp)^{-2}$; with a silyl-, especially a trialkylsilyl- derivative of the dianion ligand $(Z—Cp)^{-2}$, said silyl- group having from 1 to 20 nonhydrogen atoms; or with the neutral compound, H—(Z—Cp)—H. The reaction may optionally be performed in the presence of a reducing agent or in the presence of a Lewis base, X'. The reaction is conducted in a suitable noninterfering solvent at a temperature from −100° C. to 300° C., preferably from 25° to 70° C.

Suitable reaction media for the formation of the complexes are aliphatic and aromatic hydrocarbons, ethers, and halohydrocarbons. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aliphatic ethers such as dimethyl ether, diethyl ether, dimethoxyethane, tetrahydrofuran (THF) and mixtures thereof; fluorinated- hydrocarbons such as perfluorinated $C_{4-10}$ alkanes; and aromatic and alkyl-substituted aromatic compounds such as benzene, toluene, xylene, and mixtures thereof. Mixtures of the foregoing classes of solvents are also suitable.

The recovery procedure involves separation of the resulting alkali metal or alkaline earth metal salt and devolatilization of the reaction medium. Extraction into a secondary solvent may be employed if desired. Alternatively, if the desired product is an insoluble precipitate, filtration or other separation technique may be employed. Alternatively, the complexes may be formed in situ in the reactor and used in the subsequent polymerization without recovery.

The present process may be used to polymerize ethylene either alone or in admixture with other ethylenically unsaturated monomers having from 2 to 100,000 carbon atoms. Preferred ethylenically unsaturated monomers include the $C_{3-20}$ α-olefins especially propylene, isobutylene, 1-butene, 1-pentene, 1-hexene, 3-methyl-1-pentene, 4-methyl-1-pentene, 1octene, 1-decene, long chain, macromolecular α-olefins, and mixtures thereof. Other preferred monomers include styrene, $C_{1-4}$ alkyl substituted styrene, tetrafluoroethylene, vinylbenzocyclobutane, ethylidenenorbornene, 1,4-hexadiene, 1, 5-hexadiene, 1,7-octadiene, vinylcyclohexane, 4-vinylcyclohexene, allylbenzene, divinylbenzene, 2,5-norbornadiene and mixtures thereof. When such monomer mixtures are contacted with the catalysts relatively pure ethylene homopolymers are produced. Accordingly, the catalyst systems of the present invention are preferably used to homopolymerize ethylene.

In general, the polymerization may be accomplished at conditions well known in the prior art for Ziegler-Natta or Kaminsky-Sinn type polymerization reactions, that is, temperatures from 0°–250° C. and pressures from atmospheric to 10,000 atmospheres (0.1 to 1000 MPa). Suspension, solution, slurry, gas phase or other process conditions may be employed if desired. A support, especially silica, modified silica (silica modified by calcining, treatment with a trialkylaluminum compound having from 1 to 10 carbons in each alkyl group, or treatment with an alkylalumoxane), alumina, or a polymer (especially polytetrafluoroethylene or a polyolefin) may be employed, and desirably is employed when the catalysts are used in a gas phase or slurry polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{12}$:1 to $10^{-1}$:1, more preferably from $10^{12}$:1 to $10^{-5}$:1.

Suitable solvents or diluents for polymerization are non-coordinating, inert liquids. Examples include $C_{4-10}$ straight and branched-chain hydrocarbons, especially butane, isobutane, pentane, isopentane, hexane, heptane, octane, and mixtures thereof; cyclic and alicyclic hydrocarbons such as cyclopentane, cyclohexane, cycloheptane, methylcyclohexane, methylcycloheptane, and mixtures thereof; perfluorinated hydrocarbons such as perfluorinated $C_{4-10}$ alkanes, and aromatic and alkyl-substituted aromatic compounds such as benzene, toluene, and xylene (all isomers). Suitable solvents also include liquid olefins or other monomers or mixtures thereof as previously mentioned.

The catalysts may also be utilized in combination with at least one additional homogeneous or heterogeneous polymerization catalyst in the same or separate reactors connected in series or in parallel to prepare polymer blends having desirable properties. An example of such a process is disclosed in WO 94/00500, equivalent to U.S. Ser. No. 07/904,770, now abandoned, as well as U.S. Ser. No. 08/10958, filed Jan. 29, 1993, pending the teachings of which are hereby incorporated by reference herein.

One such polymerization process comprises:
  contacting ethylene and, optionally, one or more ethylenically unsaturated monomers other than ethylene and optionally a diluent with one or more of the aforementioned metal complexes in one or more reactors, connected in series or in parallel, and recovering the resulting polymer. Suitable reactors include continuous stirred tank reactors, tubular reactors, fluidized bed gas phase reactors, and slurry reactors.

In another such polymerization process, in one or more of the foregoing reactors, ethylene and optionally one or more ethylenically unsaturated monomers other than ethylene and optionally a diluent are contacted with one or more Group 3 metal complexes as previously described in admixture with one or more secondary catalyst compositions comprising one or more metal complexes other than a Group 3 metal complex as previously disclosed, said secondary catalyst composition also optionally comprising one or more cocatalyst activators.

In yet another process a polymer blend composition is prepared by:
  (A) contacting ethylene and optionally one or more ethylenically unsaturated monomers other than ethylene and optionally a diluent under polymerization conditions in the presence of one or more of the previously disclosed Group 3 metal complexes in at least one reactor to produce a first polymer or a solution thereof,
  (B) contacting ethylene and optionally one or more ethylenically unsaturated monomers other than ethylene and optionally a diluent under addition polymerization conditions in the presence of a secondary catalyst composition comprising a metal complex that is different than the Group 3 metal complex of step (A) in the same or a different reactor to produce a second polymer or a solution thereof,
  (C) combining the first and second polymers or solutions thereof, and
  (D) recovering a blend composition comprising the first polymer and second polymer.

In a still further embodiment, there is provided a process for preparing a polymer blend composition, comprising:
  (A) polymerizing ethylene and optionally one or more ethylenically unsaturated monomers other than ethylene and optionally a diluent in a solution process under solution polymerization conditions in at least one reactor containing a catalyst composition comprising the Group 3 metal complex as previously disclosed to produce a first polymer solution,
  (B) passing the polymer solution of (A) into at least one other reactor and adding one or more secondary catalyst compositions comprising one or more metal complexes other than a Group 3 metal complex as previously disclosedr and optionally adding ethylene, and/or one or more ethylenically unsaturated monomers other than ethylene, and/or one or more diluents thereto to form a second polymer solution,
  (C) maintaining the second polymer solution under addition polymerization conditions to form a solution of a polymer blend composition, and
  (D) recovering the polymer blend composition.

Preferred ethylenically unsaturated monomers other than ethylene for use in the above processes are $C_{3-20}$ α-olefins, especially $C_{4-8}$ α-olefins, most preferably 1-butene, 1-hexene or 1-octene.

The foregoing techniques allow for the preparation of polymer blend compositions having a broad range of molecular weight distributions and composition distributions. Most preferred polymer blend compositions possess a bimodal molecular weight distribution or bimodal density distribution caused by formation of a relatively high molecular weight or high density component consisting essentially of ethylene homopolymer due to the Group 3 metal catalyst and the formation of a relatively lower molecular weight or lower density polymer portion due to the secondary catalyst.

Preferably, the catalyst utilized in the foregoing processes as the secondary catalyst is chosen from those catalysts which are capable of efficiently incorporating $C_{3-8}$ α-olefin comonomer into the resulting polymer. Also in the most preferred embodiment of the invention, separate reactors are used for step (A) and step (B) since the use of a cocatalyst with the preferred secondary catalysts detrimentally affect the catalytic properties of the Group 3 metal complexes.

Examples of suitable secondary catalysts for use in the foregoing multi-catalyst processes include heterogeneous Ziegler catalysts comprising:

(i) a solid support component comprising magnesium halide, silica, modified silica, alumina, aluminum phosphate, or a mixture thereof, and (ii) a transition metal component represented by the formula:

$$TrX''_u(X''')_{v-u}, \text{ or } TrX''_uO(X''')_{v-u-2}$$

wherein:

Tr is a Group 4, 5, or 6 metal,

O is oxygen,

X" is halogen,

X''' is independently selected from hydrocarbyl, silyl, hydrocarbyloxy or siloxy having up to 10 non-hydrogen atoms, u is a number from 0 to 6 that is less than or equal to v, and v is the formal oxidation number of Tr.

Additional suitable catalysts include homogeneous or heterogeneous catalysts comprising a Group 4 metallocene complex including biscyclopentadienyl complexes and monocyclopentadienyl complexes. Such complexes are more fully disclosed and claimed in copending application Ser. No. 545,403, filed Jul. 3, 1994 (equivalent to EP-A-416,815), Ser. No. 241,523, filed May 13, 1994, pending, Ser. No. 304,301, filed Sep. 12, 1994, pending, U.S. Pat. Nos. 5,064,802, 5,132,380, 5,055,438, 5,198,401, and 5,321,106, and in numerous other pending applications and issued patents.

More particularly the above secondary catalysts preferably include metal complexes corresponding to the formula: $L^*_{k'}M^*Z'_{m'}X^{*'}_{n'}X^{*''}_{p'}$, dimer thereof
wherein:

L* is an anionic, delocalized, n-bonded group that is n-bound to M*, containing up to 50 nonhydrogen atoms, optionally two L* groups may be joined together forming a bridged structure, and further optionally one L* may be bound to X*;

M* is a metal of Group 4 of the Periodic Table of the Elements in the +2, +3 or +4 formal oxidation state;

Z' is an optional, divalent substituent of up to 50 nonhydrogen atoms that together with L* forms a metallocycle with M*;

X*' is an optional neutral Lewis base having up to 20 non-hydrogen atoms;

X*" each occurrence is a monovalent, anionic moiety having up to 40 non-hydrogen atoms, optionally, two X*" groups may be covalently bound together forming a divalent dianionic moiety having both valences bound to M*, or form a neutral, conjugated diene that is n-bonded to M* (whereupon M* is in the +2 oxidation state), or further optionally one or more X*' and one or more X*' groups may be bonded together thereby forming a moiety that is both covalently bound to M* and coordinated thereto by means of Lewis base functionality;

k' is 1 or 2;

m' is 0 or 1;

n' is a number from 0 to 3;

p' is an integer from 0 to 3; and the sum, k'+m'+p', is equal to the formal oxidation state of M*, or when the formal oxidation state of M* is +2, the sum, k'+m', is equal to the formal oxidation state of M*, and p' is two and both X*" groups together form a conjugated diene.

More particularly, suitable L* groups include any anionic, η-electron containing moiety capable of forming a delocalized bond with the Group 4 metal. Examples include cyclopentadienyl, allyl, and polyenyl groups, as well as substituted derivatives of such groups. Preferred L* groups include, cyclopentadienyl, indenyl, fluorenyl, tetrahydroindenyl, tetrahydrofluorenyl, octahydrofluorenyl, pentadienyl, cyclohexadienyl, cyclooctadienyl, dihydronaphthalenyl, hexahydronaphthalenyl, dihydroanthracenyl, hexahydroanthracenyl, decahydroanthracenyl groups, and hydrocarbyl substituted derivatives of such groups.

By the term "derivative" when used to describe the above substituted, delocalized η-bonded groups is meant that each atom in the delocalized η-bonded group is substituted (subject to valence limits) with a radical, R*' independently each occurrence selected from the group consisting of hydrogen, hydrocarbyl, silyl, germyl, siloxy, hydrocarbyloxy, cyano, halo and combinations thereof, said R*' (other than hydrogen, cyano and halo) having up to 20 non-hydrogen atoms. In addition two or more such R*' radicals may together form a fused ring system. Examples of the latter are the previously mentioned indenyl-, tetrahydroindenyl-, fluorenyl-, octahydrofluorenyl-, dihydroanthracenyl, hexahydroanthracenyl, and decahydroanthracenyl groups.

Suitable complexes include those containing either one or two L* groups. The latter complexes include those containing a bridging group linking the two L* groups. Preferred bridging groups are those corresponding to the formula $(E^*R^{**}_2)_{x''}$ wherein E* is silicon or carbon, R independently each occurrence is hydrogen or a group selected from silyl, hydrocarbyl and combinations thereof, said R having up to 30 carbon or silicon atoms, and x" is 1 to 8. Preferably, R** independently each occurrence is methyl, benzyl, tertbutyl or phenyl.

Examples of the foregoing bridged bis(L*) containing complexes are compounds corresponding to the formula:

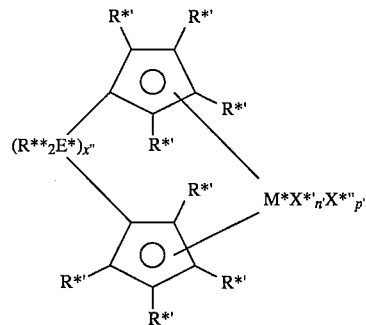

wherein:

M*, E*, R**, R*', X*', X*", x", n' and p' are as previously defined.

Such bridged structures are especially suited for the preparation of polymers having stereoregular molecular structure. In such capacity it is preferred that the complex possess $C_s$ symmetry or possess a chiral, stereorigid structure. Examples of the first type are compounds possessing different delocalized η-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem,* 232, 233–47, (1982).

Exemplary bridged cyclopentadienyl moieties in the complexes of formula (I) are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-cyclopentadienyl-fluorenyl), (1,1,2,2-tetramethyl-1,2-disilyl-bis-cyclopentadienyl), (1,2-bis(cyclopentadienyl)ethane, (1, 2-bis(indenyl)ethane, (1-cyclopentadienyl-2-indenyl)ethane, (1-tetramethylcyclopentadienyl-2-indenyl)ethane, and (cyclopentadienylisopropylidenefluorenyl).

Preferred $X^{*''}$ groups are selected from hydride, hydrocarbyl, silyl, germyl, halohydrocarbyl, halosilyl, silylhydrocarbyl and aminohydrocarbyl groups, or two $X^{*''}$ groups together with $M^*$ form a metallocyclopentene. Most preferred $X^{*''}$ groups are $C_{1-20}$ hydrocarbyl groups.

Suitable divalent Z' substituents preferably include groups containing up to 30 nonhydrogen atoms comprising at least one atom that is oxygen, sulfur, boron or a member of Group 14 of the Periodic Table of the Elements directly attached to the delocalized η-bonded group, and a different atom, selected from the group consisting of nitrogen, phosphorus, oxygen or sulfur that is covalently bonded to $M^*$.

Preferably the Group 4 metal complexes utilized in this embodiment of the present invention correspond to the formula:

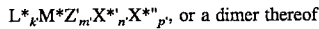

$L^*_{k'}M^*Z'_{m'}X^{*'}_{n'}X^{*''}_{p'}$, or a dimer thereof wherein:
$L^*$ is an anionic, delocalized, n-bonded group that is bound to $M^*$, containing up to 50 non-hydrogen atoms;

$M^*$ is a metal of Group 4 of the Periodic Table of the Elements in the +2, +3 or +4 formal oxidation state;

Z' is a divalent substituent of up to 50 non-hydrogen atoms that together with $L^*$ forms a metallocycle with $M^*$;

$X^{*'}$ is an optional neutral Lewis base ligand having up to 20 non-hydrogen atoms;

$X^{*''}$ each occurrence is a monovalent, anionic moiety having up to 20 non-hydrogen atoms, optionally two $X^{*''}$ groups together may form a divalent anionic moiety having both valences bound to $M^*$, or form a neutral, conjugated diene that is n-bonded to $M^*$ (whereupon $M^*$ is in the +2 oxidation state), and further optionally $X^{*'}$ and $X^{*''}$ may be bonded together thereby forming a moiety that is both covalently bound to $M^*$ and coordinated thereto by means of Lewis base functionality;

k' is 1;

m' is 1;

n' is a number from 0 to 3;

p is 1 or 2; and the sum, k'+m'+p', is equal to the formal oxidation state of $M^*$, or when the formal oxidation state of M is +2, the sum, k'+m' is equal to the formal oxidation state of $M^*$.

Cationic complexes formed upon combination of the above preferred Group 4 metal complexes wherein $M^*$ is in the +4 formal oxidation state with cation forming activating cocatalyst compounds (disclosed hereinafter) would therefor correspond to the formula:

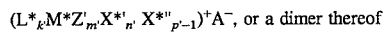

$(L^*_{k}M^*Z'_{m'}X^{*'}_{n'}\ X^{*''}_{p'-1})^+A^-$, or a dimer thereof wherein:
$M^*$, $L^*$, Z', $X^{*'}$, $X^{*''}$, $A^-$, k', m', n' and p' are as previously defined for the above preferred metal complexes.

According to the present invention, highly preferred Group 4 metal complexes for use in formation of the dual catalyst systems of the invention are those containing one and only one cyclic, delocalized, anionic, η-bonded group, said complexes corresponding to the formula:

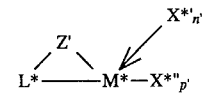

wherein:
$L^*$ is an anionic, delocalized, η-bonded group that is η-bonded to $M^*$, containing up to 50 non-hydrogen atoms;

$M^*$ is a metal of Group 4 of the Periodic Table of the Elements in the +2, +3 or +4 formal oxidation state;

Z' is a divalent substituent of up to 50 non-hydrogen atoms that together with $L^*$ forms a metallocycle with $M^*$;

$X^{*'}$ is an optional neutral Lewis base ligand having up to 20 non-hydrogen atoms;

$X^{*''}$ each occurrence is a monovalent, anionic moiety having up to 20 non-hydrogen atoms, optionally two $X^{*''}$ groups together may form a divalent anionic moiety having both valences bound to $M^*$, or form a neutral, conjugated diene that is n-bonded to $M^*$ (whereupon $M^*$ is in the +2 oxidation state), and further optionally $X^{*'}$ and $X^{*''}$ may be bonded together thereby forming a moiety that is both covalently bound to $M^*$ and coordinated thereto by means of Lewis base functionality;

n' is a number from 0 to 3;

p' is 1 or 2; and equals the formal oxidation state of $M^*$ less 2, or when the formal oxidation state of $M^*$ is +2, p' is two and both $X^{*''}$ groups together form a neutral, conjugated diene that is η-bonded to $M^*$.

More highly preferred metal coordination complexes according to the present invention correspond to the formula:

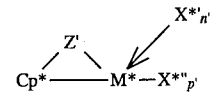

wherein Z', $M^*$ and $X^{*''}$ and p' are as previously defined;

n' is 0 or 1; and

Cp* is a $C_5H_4$ group bound to Z' and bound in an $\eta^5$ bonding mode to $M^*$ or is such an $\eta^5$ bound group substituted with from one to four substituents independently selected from hydrocarbyl, silyl, germyl, halo, cyano, and combinations thereof, said substituent having up to 20 nonhydrogen atoms, or optionally, two or more such substituents (except cyano or halo) together cause Cp* to have a fused ring structure.

Most highly preferred Group 4 metal coordination complexes used according to the present invention correspond to the formula:

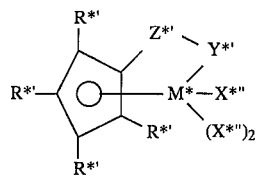

wherein:

M* is titanium or zirconium in the +4 formal oxidation state;

R*' each occurrence is independently selected from hydrogen, hydrocarbyl, silyl, germyl, halo, cyano, and combinations thereof, said R*' having up to 20 nonhydrogen atoms, and optionally, two R*' groups (where R*' is not hydrogen, halo or cyano) together form a divalent derivative thereof connected to adjacent positions of the cyclopentadienyl ring to form a fused ring structure;

X*" is halo, or a hydrocarbyl, hydrocarbyloxy or silyl group, said group having up to 20 nonhydrogen atoms;

Y*' is —O—, —S—, —NR*—, —PR*—; and

Z* is $SiR_2$, $CR_2$, $SiR_2SiR_2$, $CR_2CR_2$, $CR=CR$, $CR_2SiR_2$, or $GeR**_2$;

wherein:

R each occurrence is independently hydrogen, or a member selected from hydrocarbyl, silyl, halogenated alkyl, halogenated aryl, and combinations thereof, said R having up to 10 non-hydrogen atoms, and optionally, two R** groups from Z* (when R is not hydrogen), or an R group from Z* and an R** group from Y* form a ring system.

Further in such most highly preferred embodiment, R*' independently each occurrence is hydrogen, hydrocarbyl, silyl, halo and combinations thereof said R*' having up to 10 non-hydrogen atoms, or two R*' groups (when R*' is not hydrogen or halo) together form a divalent derivative thereof; most preferably, R*' is hydrogen, methyl, ethyl, propyl, butyl, pentyl, hexyl, (including where appropriate all isomers), cyclopentyl, cyclohexyl, norbornyl, benzyl, or phenyl or two R*' groups (except hydrogen) are linked together, the entire $C_5R*'_4$ group thereby being, for example, an indenyl, tetrahydroindenyl, fluorenyl, tetrahydrofluorenyl, or octahydrofluorenyl group.

Further most highly preferably, at least one of R*' or R** is an electron donating moiety. By the term "electron donating" is meant that the moiety is more electron donating than hydrogen. Also most highly preferably, Y* is a nitrogen or phosphorus containing group corresponding to the formula —N(R*")— or —P(R*")—, wherein R*" is $C_{1-10}$ hydrocarbyl.

Illustrative Group 4 metal complexes that may be employed in the practice of the present dual catalyst invention include:

complexes having only one L* grouping include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-$\eta$-1,4,5,6,7,8-hexahydronaphthalenyl)titaniumtrimethyl,
(1,1,2,3-tetramethyl-2,3,4,9,10-$\eta$-1,4,5,6,7,8-hexahydronaphthalenyl)titaniumtrimethyl,
(tert-butylamido)(tetramethyl-$\eta^5$-cyclopentadienyl)-dimethylsilanetitanium dichloride,
(tert-butylamido)(tetramethyl-$\eta^5$-cyclopentadienyl)-dimethylsilanetitanium dimethyl,
(tert-butylamido)(tetramethyl-$\eta^5$-cyclopentadienyl)1,2-ethanediyltitanium dimethyl,
(tert-butylamido)(tetramethyl-$\eta^5$-indenyl)dimethylsilane-titanium dimethyl,
(tert-butylamido)(tetramethyl-$\eta^5$-cyclopentadienyl)-dimethylsilanetitanium (III) 2-(dimethylamino)benzyl;
(tert-butylamido)(tetramethyl-$\eta^5$-cyclopentadienyl)-dimethylsilanetitanium (III) allyl,
(tert-butylamido)(tetramethyl-$\eta^5$-cyclopentadienyl)-dimethylsilanetitanium (II) $\eta^4$-1,4-diphenyl-1,3-butadiene,
(tert-butylamido)(tetramethyl-$\eta^5$-cyclopentadienyl)dimethylsilanetitanium (IV) $\eta^4$-1,4-diphenyl-1,3-butadiene,
(tert-butylamido)(tetramethyl-$\eta^5$-cyclopentadienyl)dimethylsilanetitanium (II) $\eta^4$-1,4-dibenzyl-1,3butadiene,
(tert-butylamido)(tetramethyl-$\eta^5$-cyclopentadienyl)dimethylsilanetitanium (II) $\eta^4$-2,4-hexadiene,
(tert-butylamido)(tetramethyl-$\eta^5$-cyclopentadienyl)dimethylsilanetitanium (IV) $\eta^4$-2,4-hexadiene,
(tert-butylamido)(tetramethyl-$\eta^5$-cyclopentadienyl)dimethylsilanetitanium (II) $\eta^4$-3-methyl-1,3-pentadiene,
(tert-butylamido)(tetramethyl-$\eta^5$-cyclopentadienyl)dimethylsilanetitanium (IV) $\eta^4$-3-methyl-1,3-pentadiene,
(tert-butylamido)($\eta^5$-2,4-dimethyl-1,3-pentadien-2-yl)dimethylsilanetitanium dimethyl,
(tert-butylamido)(1,1-dimethyl-2,3,4,9,10-$\eta$-1,4,5,6,7,8-hexahydronaphthalen- 4-yl)dimethylsilanetitaniumdimethyl, and
(tert-butylamido)(1,1,2,3-tetramethyl-2,3,4,9,10-$\eta$- 1,4,5,6,7,8-hexahydronaphthalen-4-yl)dimethylsilanetitaniumdimethyl.

bis(L) containing complexes including bridged complexes:
biscyclopentadienylzirconiumdimethyl,
biscyclopentadienyltitaniumdimethyl,
biscyclopentadienylzirconiumdiethyl,
biscyclopentadienylzirconiumdiisopropyl,
biscyclopentadienylzirconiumdiphenyl,
biscyclopentadienylzirconiumdibenzyl,
biscyclopentadienylzirconium-2,4-pentadienyl,
biscyclopentadienylzirconiummethylmethoxide,
biscyclopentadienylzirconiummethylchloride,
bis(n-butylcyclopentadienyl)zirconiumdichloride,
bis(n-butylcyclopentadienyl)titaniumdichloride,
bispentamethylcyclopentadienylzirconiumdimethyl,
bisindenylzirconiumdimethyl,
indenylfluorenylzirconiumdiethyl,
bisindenylzirconium methyl 2-(dimethylamino)benzyl,
bisindenylzirconium methyl fluoride,
bistetrahydroindenylzirconium methyl trimethylsilyl,
bispentamethylcyclopentadienylzirconiumdiisopropyl, bispentamethylcyclopentadienylzirconiumdibenzyl,
bispentamethylcyclopentadi-
  enylzirconiummethylmethoxide,
bispentamethylcyclopentadienylzirconiummethylchloride,
bispentamethylcyclopentadienylzirconiumdichloride,
bispentamethylcyclopentadienyltitaniummethylchloride,
(dimethylsilyl-bis-cyclopentadienyl)zirconiumdimethyl,
(dimethylsilyl-bis-tetramethylcyclopentadienyl)zirconium-
  2,4-pentadienyl,
(dimethylsilyl-bis-t-butylcyclopentadienyl)zirconi-
  umdichloride,
(dimethylsilyl-bis-t-butylcyclopentadienyl)titani-
  umdichloride,
(methylene-bis-tetramethylcyclopentadienyl)zirconium
  (III)2-(dimethylamino)benzyl,
(dimethylsilyl-bis-indenyl)zirconiumdichloride,
(dimethylsilyl-bis-tetrahydroindenyl)s-η4-1,4-diphenyl-1,
  3-butadiene,
(dimethylsilyl-bis-fluorenyl)zirconiumdichloride,
(dimethylsilyl-bis-fluorenyl)titaniumdichloride,
(dimethylsilyl-bis-tetrahydrofluorenyl)zirconium-
  di(trimethylsilyl),
(dimethylsilyl-tetramethylcyclopentadi-
  enylfluorenyl)zirconiumdimethyl, and
(isopropylidene-cyclopentadienyl-fluorenyl)zirconium-
  dibenzyl.

Other complexes that are useful in the preparation of secondary catalyst compositions will be apparent to those skilled in the art. Such secondary catalyst compositions preferably include a cocatalyst composition that improves the catalyst efficiency of the metal complex or renders it catalytically active.

Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium- salts of compatible, noncoordinating anion s, or ferrocenium salts of compatible, noncoordinating anions; bulk electrolysis (explained in more detail hereinafter); and combinations of the foregoing activating cocatalysts and techniques. The foregoing activating cocatalysts and activating techniques have been previously taught with respect to different metal complexes in the following references: EP-A-277,003, U.S. Pat. Nos.5, 153,157, 5,064,802, EP-A- 468,651 (equivalent to U.S. Ser. No. 07/547,718, now abandoned), EP-A-520,732 (equivalent to U.S. Ser. No. 07/876,268 pending), and EP-A-64,090 (equivalent to U.S. Ser. Nos. 07/884,966 filed May 1, 1992 now U.S. Pat. No. 5,350,723), the teachings of which are hereby incorporated by reference.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated thereto. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited toy aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(T-H)_d^+(A^{d-}),$$

wherein:

T is a neutral Lewis basel $(T-H)^+$ is a Bronsted acid;

$A^{d-}$ is a noncoordinating, compatible anion having a charge of d–, and d is an integer from 1 to 3.

More preferably $A^{d-}$ corresponds to the formula:

$$[M'^{k+}Q_q]^{d-}$$

wherein:

k is an integer from 1 to 3;

q is an integer from 2 to 6;

q–k=d;

M' is an element selected from Group 13 of the Periodic Table of the Elements; and Q independently each occurrence is selected from hydride, dialkylamido, halide, hydrocarbyl, hydrocarbyloxide, halosubstituted-hydrocarbyl, halosubstituted hydrocarbyloxy, and halo- substituted silylhydrocarbyl radicals (including perhalogenated hydrocarbyl- perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, That is, the counter ion has a single negative charge and is A⁻. Activating cocatalysts comprising boron which are particularly useful in the preparation of catalysts of this invention may be represented by the following general formula:

$$[T-H]^+ [BQ_4]^-$$

wherein:

T is as previously defined;

B is boron in a valence state of 3; and

Q is a hydrocarbyl-, hydrocarbytoxy-, fluorinated hydrocarbyl-, fluorinated hydrocarbyloxy-, or fluorinated silylhydrocarbyl- group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as: trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N N-dimethylanilinium tetraphenylborate,
N,N-diethylanilinium tetraphenylborate,
N,N-dimethyl-2,4,6-trimethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
tri(sec-butyl)ammonium tetrakis(pentafluorophenyl) borate,
N,N-dimethylanilinium tetrakis(pentafluorophenyl) borate,
N,N-dimethylanilinium n-butyltris(pentafluorophenyl) borate,
N,N-dimethylanilinium benzyltris(pentafluorophenyl) borate,
N,N-dimethylanilinium tetrakis(4-(t-butyldiimethylsilyl)-2, 3, 5, 6-tetrafluorophenyl) borate,
N,N-dimethylanilinium tetrakis(4-(triisopropylsilyl)-2, 3, 5, 6-tetrafluorophenyl) borate,
N,N-dimethylanilinium pentafluorophenoxytris(pentafluorophenyl) borate,
N,N-diethylanilinium tetrakis(pentafluorophenyl) borate,
N,N- dimethyl-2,4,6-trimethylanilinium tetrakis(pentafluorophenyl) borate,
trimethylammonium tetrakis(2,3,4,6-tetrafluorophenyl)borate,
triethylammonium tetrakis(2,3,4,6-tetrafluorophenyl) borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl) borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-2,4,6-trimethylanilinium tetrakis(2,3,4,6-tetrafluorophenyl) borate;
dialkyl ammonium salts such as:
di-(i-propyl)ammonium tetrakis(pentafluorophenyl) borate, and
dicyclohexylammonium tetrakis(pentafluorophenyl) borate;
tri-substituted phosphonium salts such as:
triphenylphosphonium tetrakis(pentafluorophenyl) borate,
tri(o-tolyl)phosphonium tetrakis(pentafluorophenyl) borate, and
tri(2,6-dimethylphenyl)phosphonium tetrakis(pentafluorophenyl) borate;
di-substituted oxonium salts such as:
diphenyloxonium tetrakis(pentafluorophenyl) borate,
di(o-tolyl)oxonium tetrakis(pentafluorophenyl) borate, and
di(2,6-dimethylphenyl)oxonium tetrakis(pentafluorophenyl) borate;
di-substituted sulfonium salts such as:
diphenylsulfonium tetrakis(pentafluorophenyl) borate,
di(o-tolyl)sulfonium tetrakis(pentafluorophenyl) borate, and
di(2,6-dimethylphenyl)sulfonium tetrakis(pentafluorophenyl) borate.

Preferred [T–H]⁺ cations are N,N-dimethylanilinium, triethylammonium and tributylammonium.

Another suitable ion forming, activating cocatalyst comprises a salt of a cationic oxidizing agent and a noncoordinating, compatible anion represented by the formula:

$$(Ox^{e+})_d(A^{d-})_e$$

wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$\hat{c}^+ A^+$$

wherein:

$\hat{c}^+$ is a $C_{1-20}$ carbenium ion; and

A⁻ is as previously defined. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$R_3Si+A^-$$

wherein:

R is $C_{1-10}$ hydrocarbyl, and A⁻ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383–384, as well as Lambert, J. B., et al., *Organometallics*, 19947 13, 2430–2443. The use of the above silylium salts as activating cocatalysts for addition polymerization catalysts is claimed in U.S. patent application Ser. No. 304,314 entitled, Silylium Cationic Polymerization Activators For Metallocene Complexes, filed in the names of David Neithamer, David Devore, Robert LaPointe and Robert Mussell on September 12, 1994.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference. Preferred complexes include phenol, especially fluorinated phenol adducts of tris(pentafluorophenyl)borane. The latter cocatalysts are disclosed and claimed in U.S. patent application Ser. No. 304,306, entitled, Phenol-Borane Adduct Polymerization Activators For Metallocene Complexes, filed in the name of Peter Nickias on Sep. 12, 1994.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0° to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter electrode respectively). Suitable materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is as previously defined.

Examples of cations, $G^+$, include tetrahydrocarbyl substituted ammonium or phosphonium cations having up to 40 nonhydrogen atoms. Preferred cations are the tetra-n-butylammonium- and tetraethylammonium- cations.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra-n-butylammonium tetrakis(pentafluorophenyl) borate.

A further recently discovered electrochemical technique for generation of activating cocatalysts is the electrolysis of a disilane compound in the presence of a source of a noncoordinating compatible anion. This technique is more fully disclosed and claimed in the previously mentioned U.S. patent application Ser. No. 304,314, filed Sep. 12, 1994.

The foregoing activating techniques and ion forming cocatalysts are also preferably used in combination, optionally also in combination with one or more tri(hydrocarbyl)aluminum or tri(hydrocarbyl)borane compounds having from 1 to 4 carbons in each hydrocarbyl group.

The molar ratio of metal complex/cocatalyst employed in the foregoing secondary catalysts preferably ranges from 1:10,000 to 100:1, more preferably from 5000 to 10:1, most preferably from 1:10 to 1:1.

Having described the invention the following examples are provided as further illustration thereof and are not to be construed as limiting. Unless stated to the contrary all parts and percentages are expressed on a weight basis.

EXAMPLES

Preparation 1
(t-Butylamido)(tetramethyl-$\eta^5$-cyclopentadienyl) dimethylsilanescandium (bis(trimethylsilyl)methyl)

a) In an inert atmosphere glove box, 10.0 g (6.04 mmol) of scandium trichloride hexahydrate ($ScCl_3 \cdot 6\ H_2O$) was dehydrated to $ScCl_3 \cdot 3THF$ by refluxing in a mixture of THF (150 mL) and $SOCl_2$ (50g, 0.42 moles). The product was isolated as a fine white powder upon removal of THF, filtration, and washing of the resulting solids with diethylether. Yield was 13.0 g, 90 percent.

The $ScCl_3 \cdot 3THF$ (6.89 g, 0.019 moles) was combined with dilithium (t-butylamido)(tetramethyl-$\eta^5$cyclopentadienyl)dimethylsilane (4.94 g, 0.019 moles) in toluene (150 mL) with stirring at 25° C. for approximately 15 hours. Filtration of the reaction mixture followed by removal of volatile components under reduced pressure resulted in a light brown residue which was washed with pentane. The product, (t-butylamido)(tetramethyl-$\eta^5$-cyclopentadienyl)dimethylsilanescandiumchloride.THF was recovered as a white solid.

2) In an inert atmosphere glove box, the above product, (t-butylamido)(tetramethyl-$\eta^5$-cyclopentadienyl)dimethylsilanescandiumchloride.THF was heated under reduced pressure at 100 ° C. for approximately 16 hours. The resulting product, (t-butylamido)(tetramethyl-$\eta^5$-cyclopentadienyl)dimethylsilanescandiumchloride was recovered. Yield was 2.16 g, 35 percent.

3) In an inert atmosphere glove box, (t-butylamido)(tetramethyl-$\eta^5$-cyclopentadienyl)dimethylsilanescandiumchloride (2.16 g) was slurried in toluene (60 mL) at 25 ° C. and lithium bis(trimethylsilyl)methyl (LiCH(Si(CH$_3$)$_3$)$_2$ (1.09 g, 6.55 mmole) was slowly added. The mixture was heated to 80 ° C. for 1 hour, cooled to 25° C. for 15 hours and devolatilized. The residue was extracted with pentane, filtered, and recrystallized from pentane at −78 ° C. Yield was 2.04 g, 68.6 percent.

Preparation 2
(t-Butylamido)(tetramethyl-η$^5$-cyclopentadienyl) dimethylsilanescandiumhydride.( 2,5-dimethyltetrahydrofuran) dimer (t-Butylamido)(tetramethyl-η$^5$-cyclopentadienyl)dimethylsilanescandium(bis(trimethylsilyl)methyl) (0.464 g, 1.02 mmole) and 2,5-dimethyltetrahydrofuran (0.102 g, 1.02 mmole) were combined with stirring in hexane (20 mL) under H$_2$ (280 kPa, 40 psi) at 25 ° C. for 24 hours. After the reaction period was ended the volatile components were removed from the solution leaving the product as a fine white powder. Yield was (0.162 g, 40 percent).

Preparation 3
(t-Butylamido)(tetramethyl-η$^5$-cyclopentadienyl) dimethylsilane yttrium 2-(N,N-dimethylaminomethyl)phenyl.tetrahydrofuran Yttrium tris(2-(N,N-dimethylaminomethyl)phenyl) (1.84 g, 3.75 mmole) and (tetramethylcyclopentadienyl)-(t-butylamino)dimethylsilane (0.943 g, 3.75 mmole) were stirred in THF (25 mL) at 60 ° C. for approximately 15 hours. After the reaction period the volatile components were removed under reduced pressure leaving a yellow oil. Dilution with pentane resulted in the precipitation of a white solid. The mixture was cooled to −78 ° C. and the white solid was washed with cold pentane resulting in the isolation of the product as a white powder. Yield was 1.06 g, 52 percent.

POLYMERIZATION

All solvents were purified by passage through double columns charged with alumina and zeolite (Q-5™ catalyst, available from Englehard Corp.). A 2L stirred reactor was charged with 740 mL of mixed alkane solvent (Isopar™ E, available from Exxon Inc.) and 128 g of 1-octene comonomer. Where used, methylalumoxane (MAO) and triisobutyl aluminum (TIBA) were added to the solvent/comonomer mixture. Hydrogen chain terminator was added by differential pressure expansion from a ~75 mL addition tank to provide a differential pressure of 270 Kpa, 25 psi. The reactor was heated to 140° C. and saturated with ethylene at 3450 Kpa. 0.4 mL of a 0.0050 M metal complex solution (in toluene) (2 µmol) was then injected into the reactor. Where used, trisperfluorophenylborane (TPFPB) was added to the catalyst solution before addition to the reactor. The polymerization was allowed to proceed for 15 minutes with ethylene on demand. The solution was then removed from the reactor and quenched with isopropanol. A hindered phenol antioxidant (Irganox™ 10t0, available from Ciba Geigy Corp.) was added to the polymer solution. The polymer was dried in a vacuum oven set at 120° C. for about 20 hours. Polymer yields are contained in Table 1 along with a comparative example wherein the complex contained a coordinating Lewis base such as was disclosed by Shapiro, et al., *Organometal.*, 9, 867–869 (1990).

TABLE I

| Run | catalyst (µmol) | cocatalyst (µmol) | efficiency-Kg polymer/g Group 3 metal |
|---|---|---|---|
| 1 | prep. 1 (2.0) | — | 2,800 |
| 1a* | prep. 1 (2.0) | MAO (2000) | 29 |
| 1b* | prep. 1 (2.0) | TPFPB (2.0) | 31 |
| 2 | prep. 2 (2.0) | — | 1,200 |
| 2a* | prep. 2 (2.0) | TIBA (66) | 434 |
| 2b* | prep. 2 (2.0) | MAO (2000) | 11 |
| 2c* | prep. 2 (2.0) | TPFPB (2.0) | 45 |
| 3 | prep. 3 (2.0) | — | 35 |
| 3a* | prep. 3 (2.0) | MAO (2000) | 2 |
| 3b* | prep. 3 (2.0) | TPFPB (2.0) | 2 |
| 4a* | STMP$^1$ (2.0) | — | 7 |
| 4b* | STMP$^1$ (2.0) | TIBA (66) | 11 |
| 4c* | STMP$^1$ (2.0) | MAO (2000) | 6 |
| 4d* | STMP$^1$ (2.0) | TPFPB (2.0) | 4 |

*comparative example, not an example of the invention.
$^1$(t-butylamido)(tetramethyl-η$^5$-cyclopentadienyl)dimethylsilanescandiumhydride ● trimethylphosphine dimer prepared by reaction of equimolar quantities of (t-butylamido)(tetramethyl-η$^5$-cyclopentadienyl)dimethylsilanescandium bis(trimethylsilyl)methyl with a toluene solution of trimethylphosphine. The reaction was conducted in pentane under H$_2$ (280 kPa, 40 psig).

What is claimed is:

1. An ethylene homopolymerization process comprising contacting an ethylene containing reaction mixture with a catalyst consisting essentially of a metal complex corresponding to the formula:

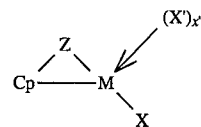

wherein:

M is a Group 3 metal;

Cp is a cyclopentadienyl group bound in an η$^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 40 nonhydrogen atoms, or optionally, two or more such substituents are joined together to form a hydrocarbylene group thereby causing Cp to have a fused ring structure;

Z is a moiety comprising boron, or a member of Group 14 of the Periodic Table of the Elements, and optionally nitrogen, phosphorus, sulfur or oxygen, said moiety having up to 20 non-hydrogen atoms, and optionally Cp and Z together form a fused ring system;

X, independently each occurrence, is hydride, hydrocarbyl, siiyl, germyl, hydrocarbyloxy, amido, phosphido, sulphido, or a combination thereof, said X containing up to 50 atoms;

X' is a stable, weakly coordinating Lewis base ligand group selected from the group consisting of triphenylphosphine, fluorinated triarylphosphines, tetrahydrofuran, 2,5-dimethyltetrahydrofuran, and olefins; and x' is 0 or 1, and recovering the polymeric product.

2. A process according to claim 1 comprising contacting the reaction mixture with at least one additional secondary homogeneous or heterogeneous polymerization catalyst in the same or a separate reactor connected in series or in parallel to prepare a polymer blend.

3. A process for preparing a polymer blend composition, comprising:

(A) contacting ethylene and optionally one or more ethylenically unsaturated monomers other than ethylene and optionally a diluent under polymerization conditions in the presence of one or more catalysts consisting essentially of a metal complex corresponding to the formula:

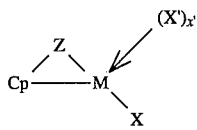

or a dimer thereof
wherein:

M is a Group 3 metal;

Cp is a cyclopentadienyl group bound in an $\eta^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 40 nonhydrogen atoms, or optionally, two or more such substituents are joined together to form a hydrocarbylene group thereby causing Cp to have a fused ring structure;

Z is a moiety comprising boron, or a member of Group 14 of the Periodic Table of the Elements, and optionally nitrogen, phosphorus, sulfur or oxygen, said moiety having up to 20 non-hydrogen atoms, and optionally Cp and Z together form a fused ring system;

X, independently each occurrence, is hydride, hydrocarbyl, silyl, germyl, hydrocarbyloxy, amido, phosphido, sulphido, or a combination thereof, said X containing up to 50 atoms;

X' is a stable, weakly coordinating Lewis base ligand group; and x' is 0 or 1, in at least one reactor to produce a first polymer or a solution thereof, (B) contacting ethylene and optionally one or more ethylenically unsaturated monomers other than ethylene and optionally a diluent under addition polymerization conditions in the presence of secondary catalyst composition comprising a metal complex that is different than the Group 3 metal complex of step (A) in the same or a different reactor to produce a second polymer or a solution thereof, (C) combining the first and second polymers or solutions thereof, and (D) recovering a blend composition comprising the first polymer and second polymer.

4. A process for preparing a polymer blend composition, comprising:

(A) polymerizing ethylene and optionally one or more ethylenically unsaturated monomers other than ethylene and optionally a diluent in a solution process under solution polymerization conditions in at least one reactor containing a catalyst composition consisting essentially of a metal complex corresponding to the formula:

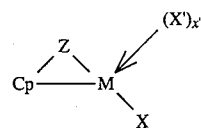

or a dimer thereof
wherein:

M is a Group 3 metal;

Cp is a cyclo pentadienyl group bound in an $\eta^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 40 nonhydrogen atoms, or optionally, two or more such substituents are joined together to form a hydrocarbylene group thereby causing Cp to have a fused ring structure;

Z is a moiety comprising boron, or a member of Group 14 of the Periodic Table of the Elements, and optionally nitrogen, phosphorus, sulfur or oxygen, said moiety having up to 20 non-hydrogen atoms, and optionally Cp and Z together form a fused ring system;

X, independently each occurrence, is hydride, hydrocarbyl, silyl, germyl, hydrocarbyloxy, amido, phosphido, sulphido, or a combination thereof, said X containing up to 50 atoms;

X' is a stable, weakly coordinating Lewis base ligand group; and x' is 0 or 1, to produce a first polymer solution, (B) passing the first polymer solution into at least one other reactor and adding one or more secondary catalyst compositions comprising one or more metal complexes other than said Group 3 metal complex, and optionally adding ethylene, and/or one or more ethylenically unsaturated monomers other than ethylene, and/or one or more diluents thereto, (C) maintaining the polymer solution under addition polymerization conditions to form a solution of a polymer blend composition, and (D) recovering the polymer blend composition.

5. A process according to any of claims 1 to 4 wherein the Group 3 metal complex corresponds to the formula:

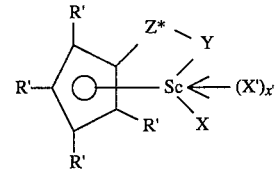

wherein R' each occurrence is independently selected from the group, consisting of hydrogen, alkyl, aryl, silyl, germyl, cyano, halo and combinations thereof, said R' having up to 30 atoms, or two R' groups together form a divalent hydrocarbylene derivative connected to adjacent positions of the cyclopentadienyl ring, forming a fusid ring;

X is hydride, hydrocarbyl, silyl, or a combination thereof, said X having up to 30 atoms;

Y is —O—, —S—, —NR*—, —PR*—;

Z* is SIR*$_2$, CR*$_2$, SiR*$_2$SiR*$_2$, CR*$_2$CR*$_2$, CR*=CR*, CR*$_2$SiR*$_2$, GeR*$_2$, or BR*; wherein:

R* each occurrence is independently selected from the group consisting of hydrogen, alkyl, aryl, silyl, halogenated alkyl, halogenated aryl groups having up to 20 non-hydrogen atoms, and mixtures thereof;

X' is triphenylphosphine, a fluorinated tri aryl phosphine, tetrahydrofuran, or 2,5-dimethyltetrahydrofuran; and x' is 0 or 1.

6. A process according to claim 5 wherein the Group 3 metal complex corresponds to the formula:

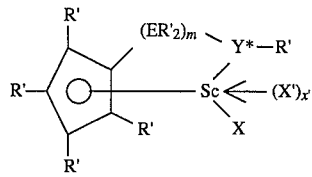

or a dimer thereof
wherein:

Y* is N or P;

X is hydride, methyl, bis(trimethylsilyl)-methyl; trimethylsilyl, trimethylsilylmethyl, allyl, 2-(N,N-dimethylaminomethyl)phenyl, or 2-(N,N-dimethylamino)benzyl;

R' each occurrence is independently selected from the group consisting of hydrogen, silyl, alkyl, aryl and combinations thereof having up to 10 carbon or silicon atoms, or two R' groups together form a divalent hydrocarbylene derivative connected to adjacent positions of the cyclopentadienyl ring;

E independently each occurrence is silicon or carbon;

m is 1 or 2;

X' is tris(pentafluorophenyl)phosphine or 2,5-dimethyltetrahydrofuran; and x' is 0 or 1.

7. A process according to claim 6 wherein R' on the amido group is methyl, ethyl, propyl, butyl, pentyl, hexyl, norbornyl, benzyl, or phenyl; and the cyclopentadienyl group is cyclopentadienyl, tetramethylcyclopentadienyl, indenyl, tetrahydroindenyl, fluorenyl, tetrahydrofluorenyl or octahydrofluorenyl.

8. A process according to any of claims 1 to 4 wherein the Group 3 metal complex is selected from the group consisting of (tert-butylamido)(tetramethyl-η$^5$-cyclopentadienyl)dimethylsilanescandium (bis(trimethylsilyl)methyl); (t-butylamido)(tetramethyl-η$^5$-cyclopentadienyl)dimethylsilanescandium hydride.(2,5dimethyltetrahydrofuran) dimer; and (tert-butylamido)(tetramethyl-η$^5$-cyclopentadienyl)dimethylsilaneyttrium(2-(N,N-dimethylaminomethyl)phenyl).

9. A process according to any one of claims 2 to 4 wherein the secondary catalyst comprises a metal complex corresponding to the formula:

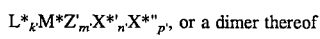

wherein:

L* is an anionic, delocalized, η-bonded group that is η-bound to M*, containing up to 50 nonhydrogen atoms, optionally two L* groups may be joined together forming a bridged structure, and further optionally one L* may be bound to X*;

M* is a metal of Group 4 of the Periodic Table of the Elements in the +2, +3 or +4 formal oxidation state;

Z' is an optional, divalent substituent of up to 50 non-hydrogen atoms that together with L* forms a metallocycle with M*;

X*' is an optional neutral Lewis base having up to 20 non-hydrogen atoms;

X*'' each occurrence is a monovalent, anionic moiety having up to 40 non-hydrogen atoms, optionally, two X*'' groups may be covalently bound together forming a divalent dianionic moiety having both valences bound to M*, or form a neutral, conjugated diene that is n-bonded to M* (whereupon M* is in the +2 oxidation state), or further optionally one or more X* and one or more X*' groups may be bonded together thereby forming a moiety that is both covalently bound to M* and coordinated thereto by means of Lewis base functionality;

k' is 1 or 2;

m' is 0 or 1;

n' is a number from 0 to 3;

p' is an integer from 0 to 3; and the sum, k'+m'+p', is equal to the formal oxidation state of M*, or when the formal oxidation state of M* is +2, the sum, k'+m', is equal to the formal oxidation state of M*, and p' is two and both X*'' groups together form a conjugated diene.

10. A process according to claim 9 wherein the secondary catalyst comprises a metal complex corresponding to the formula:

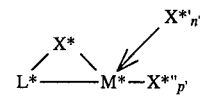

wherein:

L* is an anionic, delocalized, n-bonded group that is n-bonded to M* containing up to 50 nonhydrogen atoms;

M* is a metal of Group 4 of the Periodic Table of the Elements in the +2, +3 or +4 formal oxidation state;

Z' is a divalent substituent of up to 50 nonhydrogen atoms that together with L* forms a metallocycle with M*;

X*' is an optional neutral Lewis base ligand having up to 20 non-hydrogen atoms;

X*'' each occurrence is a monovalent, anionic moiety having up to 20 non-hydrogen atoms, optionally two X*'' groups together may form a divalent anionic moiety having both valences bound to M*, or form a neutral, conjugated diene that is n-bonded to M* (whereupon M* is in the +2 oxidation state), and further optionally X*' and X*'' may be bonded together thereby forming a moiety that is both covalently bound to M* and coordinated thereto by means of Lewis base functionality;

n' is a number from 0 to 3;

p' is 1 or 2; and equals the formal oxidation state of M* less 2, or when the formal oxidation state of M* is +2, p' is two and both X*'' groups together form a neutral, conjugated diene that is n-bonded to M*.

L*, M*, X*, X*', X*'', n', and p' are as previously defined.

11. A process according to claim 10 wherein the Group 3 metal complex is (t-butylamido)(tetpamethyl-$\eta^5$-cyclopentadienyl)dimethylsilanescandium (bis(trimethylsilyl)methyl) and the secondary catalyst comprises (t-butylamido)(tetramethyl-$\eta^5$-cyclopentadienyl) dimethylsilanetitanium dimethyl.

* * * * *